United States Patent Office 2,720,793
Patented Oct. 18, 1955

2,720,793

CONTROL SYSTEMS FOR POWER TRANSMISSIONS

Douglas Fowler Linsley, Westport, Conn., assignor to Myrick A. Walden, East Haddam, Conn.

Application February 27, 1951, Serial No. 212,981

16 Claims. (Cl. 74—472)

This invention relates to multi-speed power transmissions, such, for example, as those employed on motor vehicles, and more particularly to an improved system for controlling and effecting the operation of shifting such transmission from one gear ratio to another.

For the purposes of disclosure the invention is illustrated and described in connection with a two-speed axle transmission of the type used, for example, on trucks, and also on passenger cars to provide an overdrive. Such a transmission comprises high and low speed gears and a shift mechanism for selectively shifting the transmission gears to obtain the desired gear ratio. Those systems heretofore provided for this purpose have been unsatisfactory. Their use has usually involved various manual operations by the driver, requiring removal of his hand from the steering wheel and frequently his eyes from the road. Their operation has been so complicated that many truck drivers refuse to bother with it and thus lose the advantages of the two-speed axle drive.

An object of this invention is to provide an improved and simplified system constructed and arranged to permit shifting into a selected gear ratio at will, independently of vehicle speed and without removing a hand from the steering wheel.

A further object is to provide an improved fluid pressure operated control system for two-speed axle transmissions constructed and arranged to insure the transmission remaining in gear when the associated vehicle is parked, regardless of possible dissipation of the operating pressure.

A further object is to provide an improved control system for two-speed axle transmissions in which the transmission is automatically shifted into low gear ratio upon stopping the engine, whether by intentionally cutting the ignition or by stalling the engine.

A further object is to provide an improved two-speed axle shift and control mechanism constructed and arranged to be responsive to and controlled by the vacuum in the engine manifold.

A still further object is to provide an improved control system of the type set forth constructed and arranged to automatically effect both downshift from high to low gear and upshift from low to high in a two-speed axle merely by breaking the vacuum in the engine manifold, which can be accomplished by throttle manipulation through the accelerator pedal and without requiring any hand operation.

One advantageous feature of the invention is the fact that the entire system, including signal lights, etc., "goes dead" whenever the vehicle engine stops, either from shutting off the ignition, stalling, or other cause, and all consumption of current by the system stops.

With the foregoing and other objects in view, I have devised the construction illustrated in the accompanying drawing forming a part of this specification. It is, however, to be understood the invention is not limited to the specific details of construction and arrangement shown, but may embody various changes and modifications within the scope of the invention.

Figure 1:
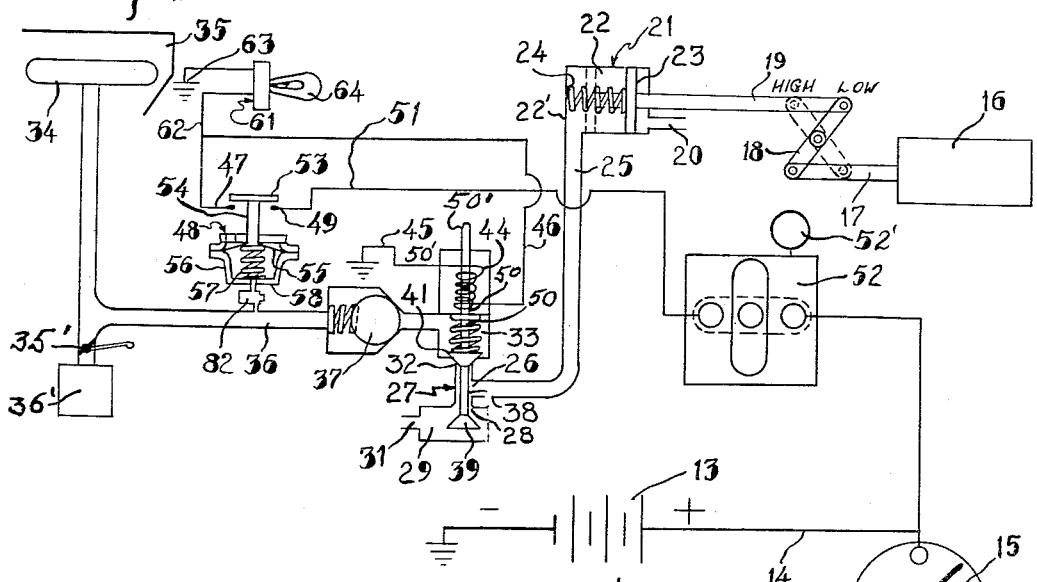
Fig. 1 is a diagrammatic view showing a transmission control and operating system constructed in accordance with one embodiment of this invention employing a power unit operated by vacuum in one direction and by spring pressure in the other.

The invention is illustrated in connection with a motor vehicle having an ignition system 11, provided with a ground connection 12 at one side and connected to a battery 13 or other source of potential by a conductor 14 controlled by a conventional ignition switch 15.

For the purposes of disclosure, the invention is herein shown and described in connection with a two-speed axle 16 of conventional construction for a motor vehicle, indicated diagrammatically on the drawing, and having the usual high speed and low speed gear ratios. The shift mechanism for shifting from one speed to another includes a shift rod 17 connected to one end of a pivoted link 18, the opposite end of which is connected to one end of a power operated rod 19 adapted to be actuated by a power unit 21 for selectively shifting the transmission 16 from one speed to another.

The power unit, as illustrated in Fig. 1, includes a chamber 22 in which a movable member responsive to pressure differential, which may be in the form of a sliding piston 23, a flexible diaphragm, or the like, is connected to the adjacent end of the reciprocable, power-operated rod 19. In the form shown in Fig. 1, a compression spring 24 is positioned between the piston or diaphragm 23 and one end wall 22' of the chamber 22, so that the spring tends to move the power rod 19 to the right as shown in Fig. 1, and engage the transmission in low gear. The end wall of the chamber 22 opposite the spring 24 has a vent 20 to the atmosphere. On the opposite side of the piston or diaphragm 23 from the vent 20 the chamber 22 is connected by a tube or conduit 25 to a port 26 centrally located in the housing of a control valve 27. The control valve 27 has a lower port 28 leading to a chamber 29 in communication with the atmosphere through a vent 31, and an upper port 32 leading to a chamber 33 connected to the inlet manifold 34 of the internal combustion engine 35 on the associated vehicle through a conduit 36 connected between the manifold and a throttle valve 35' above a carburetor 36' having a check valve 37 which prevents pressure flow from the manifold into the control valve 27, thereby preventing any break in manifold vacuum from being transmitted through the control valve 27 to the power unit 21. The control valve 27 includes a valve rod 38 having a lower valve body 39 controlling the vented lower port 28, and an upper valve body 41 controlling the upper port 32, the two valve bodies being so spaced that when the rod 38 is lowered to close the upper port with the upper valve body 41, the lower vented port is open, while when the rod 38 is raised to close the lower port 28, the upper port 32 is open.

The present invention makes use of manifold vacuum both for operating the gear shifting power unit 21 and for controlling and timing such operation. For this purpose, as illustrated, the valve rod 38 of the control valve 27 is connected directly to the core 43 of a valve-actuating solenoid having a core 50 provided with a guide pin 50' and a coil 44 one end of which is connected to a ground connection 45 and the other end connected by a conductor 46 to one terminal 47 of a solenoid circuit control switch 48, the other terminal 49 of which is connected by a conductor 51 to battery through a manually operated main switch 52. The main switch 52 is preferably an alternating on and off type capable of operation by the driver's foot pressing a foot button 52', in the manner of the conventional foot-operated dimmer switch now in general use, although any other on and off switch can be used if desired.

The solenoid circuit control switch 48 includes a movable contact member 53 mounted on a stem 54 connected to and controlled by a switch-operating member which is responsive to manifold vacuum. As illustrated, the stem 54 is connected to a diaphragm 55 movably housed in an enclosing chamber 56. A compression spring 57 in the chamber 56 is compressed between the diaphragm 55 and the opposite end 58 of the chamber 56, and the spring is preferably so adjusted as to move the contact plate 53 into open circuit position, as shown in Fig. 1, when the vacuum in the intake manifold is reduced to not more than approximately two inches of mercury. The adjustment is such that vacuum in excess of this amount causes the diaphragm to move against the pressure of the spring 57 into circuit closing position, thereby energizing the control valve operating solenoid 44, raising the valve rod 38 and valve bodies 39, 41, and connecting the power unit 21 to the inlet manifold 34. This moves the piston or diaphragm 23 to the left in Fig. 1 against the compression of the spring 24 and shifts the transmission 16 into high gear, all assuming that the manual switch 52 is in the closed circuit position. When the manifold vacuum drops below about 2 inches of mercury, the solenoid circuit control switch 48 is opened by the spring 57 to de-energize the solenoid 44. This drops the valve rod 38, dumping the vacuum from the chamber 22 of the power unit and permitting the spring 24 to shift the transmission into low gear.

The invention includes an indicator device for informing an operator whenever the solenoid 44 is energized and the system conditioned for high gear. As illustrated, this comprises a light 61 in a light circuit formed by a conductor 62 extending from the conductor 46 to a ground connection 63. Being in parallel with the solenoid 44, the circuit permits the use of a standard voltage lamp 64 in the indicator circuit.

Figure 2:
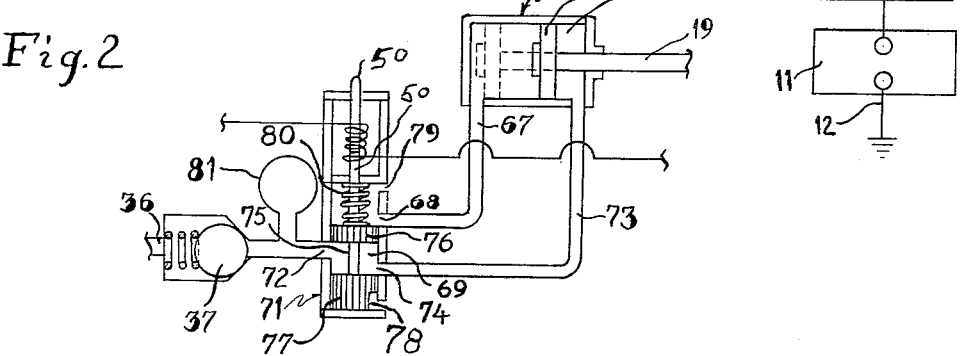
Fig. 2 is a similar view of the control system shown in Fig. 1, adapted to a power unit which is vacuum operated in both directions.

Fig. 2 illustrates the invention applied to a system employing an all vacuum power unit 64' in place of the diaphragm and spring operated unit 21 shown in Fig. 1. As illustrated, the power unit comprises a chamber 65 having a piston or diaphragm 66 connected to the operating rod 19. One end of the chamber 65 is connected by a conduit 67 to a port 68 at one side of a valve chamber 69 in a control valve 71 having a central port 72 connected through the check valve 37 to the conduit 36 leading to the inlet manifold 34. The other end of the chamber 65 is connected by a conduit 73 to a port 74 at the other side of the valve chamber 69 opposite the port 68. A valve rod 75 has spaced upper and lower valve bodies 76, 77 respectively, formed with flow channels 78 in their surfaces cooperating with vents 79 in the valve casing, whereby when the valve operating solenoid 44 is de-energized the valve bodies are lowered, connecting the conduit 73 with the inlet manifold and opening the conduit 67 to the atmosphere, thereby shifting the piston 66 to the right in Fig. 2 and shifting the transmission into low gear. Energizing the solenoid 44 raises the valve body to apply vacuum to the opposite end of the chamber 65 and opens the conduit 73 to the atmosphere, thereby shifting the piston to the left in Fig. 2, and shifting the transmission into high gear. As shown in Fig. 2, a compression spring 80 is provided in the control valve above the upper valve body 76 to insure quick action of the valve when the solenoid is de-energized.

In the arrangement illustrated in Fig. 2, a vacuum reserve tank 81 is connected to the conduit 36 between the check valve 37 and the control valve 71, for a purpose to be hereinafter described.

Figure 3:
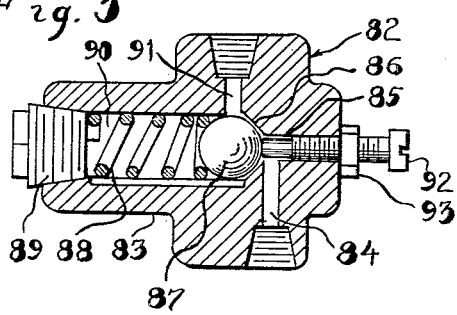
Fig. 3 is a section through an adjustable check valve used for a purpose to be later described.

Preferably, the vacuum operated solenoid circuit switch 48 is arranged to break quickly and close slowly in order to facilitate the hereafter described operation. This can be accomplished in any desired way, to effect a slow return of the control valve 27 from low gear to high gear position. As illustrated in Fig. 3, for example, an adjustable check valve 82 is provided in the connection between the conduit 36 leading to the inlet manifold and the switch chamber 56. The check valve comprises a housing 83 having a flow passage 84 communicating with a bore 85 formed with a valve seat 86 for a ball valve 87 pressed toward the seat by a spring 88 compressed between the ball and a closure plug 89 threaded in the end of a second bore 90 forming a continuation of the bore 85. A second flow passage 91 communicates with the bore 90 on the opposite side of the valve seat from the first flow passage 84. The flow passage 84 is adapted to be connected to the conduit 36, while the flow passage 91 is connected to the switch chamber 56. A valve adjusting screw 92 is threaded into the end of the bore 85 opposite the valve spring 88 and can be secured in adjusted position by a lock nut 93 or similar device. The inner end of the adjusting screw 92 is positioned to hold the ball valve 87 slightly off the seat 86 against the pressure of the valve spring 88. By this means, when the vacuum is broken in the inlet manifold, the increase in pressure is transmitted instantly to the switch diaphragm 55 to raise the contact plate 53 and de-energize the solenoid 44, but upon re-establishment of vacuum the reduction of pressure in the chamber and return of the switch to closed position to re-energize the solenoid is delayed by the check valve 82, the time required being determined by adjustment of the screw 92 which in turn fixes the size of the opening between the ball valve 87 and its seat 86.

It will be apparent that other slow return devices can be employed.

The present system enables a driver to control at will the operation of the shift mechanism at all times and under all conditions of vehicle operation and speed, without requiring any complicated hand maneuvers and, in fact, without having to remove either hand from the steering wheel.

By opening the foot-controlled main switch 52 so as to break the solenoid circuit and permanently de-energize the solenoid, the control valve 27 in Fig. 1 is held in its lower position to vent the chamber 22 to atmosphere so that the spring 24 holds the transmission in low gear. Under these conditions no shift into high can be made.

To bring the system into automatic gear shifting operation, all that is required is to close the main switch 52. When, as preferred, this switch is located on the floor and is operated by a foot button, all that is required of the driver is to press the button with his foot in the manner of the conventional automatic dimmer switch. When the engine is running, this connects the solenoid to battery and conditions the system for automatic gear shifting operation.

Assuming that the engine is idling and the vehicle stationary, the vacuum established in the inlet manifold 34 actuates the solenoid circuit control switch 48 against the pressure of the spring 57 to hold the contact plate 53 in circuit closing position. With the main switch 52 closed, this operation energizes the solenoid, lifting the control valve 27 to connect the chamber 22 of the power unit 21 to vacuum, thereby drawing the diaphragm or piston 23 to the left in Fig. 1 and shifting the transmission into high gear, as indicated by broken lines. However, the main vehicle transmission being in neutral, the engine continues to idle and the vehicle remains stationary. It will, of course, be understood that the vehicle may be operated and the successive gear ratios of the conventional vehicle transmission be shifted through and into high with the two-speed axle transmission in high and without shifting the latter into low gear. This may be the case, for example, with unloaded trucks when the torque required to attain speed is not high. However, assuming that it is desirable or necessary to shift the two-speed axle transmission into low gear ratio to start movement of the vehicle and attain vehicle speed, as will be the case with a loaded truck or other vehicle, this can be done while idling the engine by depressing the accelerator to open the throttle far enough to break the vacuum in the inlet manifold. This opens the solenoid control switch 48, the contact plate 53 being quickly snapped by the spring 57 to break the solenoid circuit. This, in turn, drops the valve bodies 39, 41 and dumps the vacuum from the chamber 22 through the valve vent 31. The spring 24 immediately shifts the transmission into low gear. Assuming that the vehicle transmission is in gear and the clutch disengaged, letting up on the accelerator re-establishes vacuum in the manifold, but the effect of such vacuum on the switch 48 is delayed by the check valve 82, causing the switch 48 to remain open long enough for the driver to re-engage the vehicle clutch and thus apply torque to the driving shaft before the solenoid is re-energized. The rear axle gears being in low are thus held in low gear by such torque even after the solenoid 44 is re-energized and vacuum again becomes effective on the power unit. Thus, although the system is conditioned for shift into high gear, by energizing of the solenoid, the torque on the gears hold the rear axle transmission in low. Under these circumstances, upon attaining suitable speed the two-speed axle transmission can be shifted into high merely by disengaging the vehicle clutch or merely by closing the throttle, or both, to relieve the gears of torque, whereupon the vacuum in the chamber 22 causes the diaphragm to shift the transmission into high. This is done while leaving the standard truck transmission in low. This same operation can be repeated in each upward shift of the vehicle transmission. The result is to double the number of gear ratios that can be obtained from a standard vehicle transmission.

When the vehicle is moving with the two-speed axle transmision in high gear, a downshift thereof to low gear is easily made, even with the main switch 52 closed, by breaking the manifold vacuum through pressing the accelerator pedal far enough to open the throttle wide. This relieves the piston or diaphragm 23 of the vacuum pull and conditions it for shifting into low gear under pressure of the spring 24. However, the torque on the gears holds them in high until the accelerator pedal is let up and the throttle at least partly closed. This relieves the gear of torque and results in shifting to low before the slow return switch 48 has been closed by the re-established vacuum. After the shift, immediate re-opening of the throttle, by pressing the pedal down, again applies torque to the gears in low and holds them in low gear, even with vacuum reestablished, until such torque is again relieved by pedal manipulation to close the throttle for the purpose of shifting back into high. This shifting operation is done quickly and easily. If the driver prefers, he can relieve torque on the gears by clutch disengagement, but this requires operating the clutch pedal in addition to the throttle and is not necessary.

When the vehicle engine is stopped, either intentionally by cutting the ignition or by stalling, the resulting break of the vacuum de-energizes the solenoid and permits the spring 24 in the arrangement shown in Fig. 1 to immediately shift the axle transmission into low gear where it is retained by spring pressure until the engine is restarted and vacuum restored. This insures against slipping out of gear through dissipation of pressure or for any other reason while the vehicle is left parked. If the engine is stopped on a down grade with the transmission in high and torque on the gear, it will remain in high because of such torque. If the vehicle starts pushing the engine it will remain in high because turning the engine will establish the necessary vacuum in the manifold.

With the all vacuum system shown in Fig. 2, de-energizing the solenoid 44 allows the control valve 71 to shift and dump the vacuum from the left side of the piston 65 and at the same time connect the right side thereof to the vacuum reserve tank 81, which draws the piston 65 to the right in Fig. 1 and shifts the axle gears into low gear.

In order to forestall unintentional breaking of the solenoid circuit by the control switch 48 as a result of normal vacuum variations resulting from normal operating variations in the throttle opening, the switch operating spring 57 is adjusted to break the circuit only on a predetermined low vacuum condition, while the distance between the diaphragm 55 and the contact plate 53 is fixed to break the circuit at a certain determinate position of the diaphragm 55 in the chamber 56. Adjustment of these members permits ordinary throttle operation without effecting operation of the control system.

Operation of the all vacuum system shown in Fig. 2 is similar. However, with this system the shift into low gear is accomplished by vacuum in place of the spring 24. When this system is employed without the vacuum reserve tank 81, the shift into low will be accomplished as long as the engine is operating to produce the necessary vacuum in the manifold. However, without the reserve tank 81, upon stopping the engine the gears will remain in whatever gear ratio they may be at the time. The purpose of a vacuum reserve tank 81 is to take the place of the spring 24 to accomplish an automatic shift into low whenever the engine stops, with resulting de-energizing of the solenoid. The size of the tank 81 is sufficient to provide enough vacuum to accomplish such shift. Being connected to the conduit between the control valve 71 and the check valve 37, the reserve tank 81 is substantially never open to atmosphere and the vacuum established in it through connection to the conduit 36 is maintained therein.

When the main switch 52 is open it permanently de-energizes the solenoid 44 and results in maintaining the transmission 16 in low gear, under all driving conditions. When the main switch 52 is closed, for example by a foot-operated button, the solenoid circuit is thereby placed under control of the vacuum responsive switch and the transmission can be shifted into high or low gear, as above described, the operation of the control valve 37 being responsive to manifold vacuum and directly controlling the operation of the transmission shifting power unit.

Also, because of the vacuum control of the solenoid circuit switch 48, when the engine is shut off the entire system is similarly shut off, the solenoid being de-energized, the signal light extinguished, and the vacuum dumped from the power unit, all irrespective of whether or not the main switch 52 is open or closed.

The invention can be variously modified and adapted within the scope of the appended claims.

Having thus set forth the nature of my invention, I claim:

1. A control system for use in a motor vehicle having an engine provided with an inlet manifold, a multi-speed transmission including high and low gear ratios and gear shift mechanism for said transmission, comprising a power mechanism for selectively shifting said transmission into one or another of said gear ratios including a power unit having a differential pressure operated means connected to said shift mechanism, a valve member controlling the application of pressure differential to said means, mechanism for operating said valve, vacuum responsive devices connected with the manifold for controlling said operating mechanism to apply a pressure differential to said pressure operated means to cause said means to shift said transmission into one gear ratio when the manifold vacuum is above a determinate amount, and to vary the pressure differential on said means to cause the same to shift said transmission into another gear ratio when said vacuum is less than said determinate amount, said devices constituting the sole means for controlling automatically said valve, and manually controlled means for rendering said vacuum responsive mechanism ineffective to operate said valve.

2. A control system for use in a motor vehicle having an engine provided with an inlet manifold, a multi-speed transmission including high and low gear ratios and gear shift mechanism for said transmission, comprising mechanism for selectively shifting said transmission into one or another of said gear ratios including a power unit having a differential pressure operated means connected to said shift mechanism, a valve member connected to said manifold to control the application of pressure differential to said means, mechanism for controlling and operating the valve comprising a solenoid for operating said valve, a solenoid circuit, a solenoid controlling switch in said circuit, a switch actuating member connected to said manifold and operable to open or close said solenoid circuit in accordance with the degree of vacuum in said manifold and operate the valve to cause said differential pressure operated means to actuate the shift mechanism to shift into high gear ratio when the vacuum in the manifold rises above a predetermined amount and to cause said means to actuate the shift mechanism to shift into low gear ratio when the vacuum in the manifold falls below a predetermined amount, said valve operating mechanism forming the sole means for operating the valve, and a manually operable switch in said solenoid circuit in series with said circuit controlling switch.

3. A control system for use in a motor vehicle having an engine provided with an inlet manifold, a multi-speed transmission including high and low gear ratios and gear shift mechanism for said transmission, comprising mechanism for selectively shifting said transmission into one or another of said gear ratios including a power unit having a differential pressure operated means connected to said shift mechanism, a valve member connected to said manifold to control the application of pressure differential to said means, mechanism for controlling and operating the valve comprising a solenoid for operating said valve, a solenoid circuit, a solenoid controlling switch in said circuit, a switch actuating member connected to said manifold and operable to open or close said solenoid circuit in accordance with the degree of vacuum in said manifold and operate the valve to cause said differential pressure operated means to actuate the shift mechanism to shift into high gear ratio when the vacuum in the manifold rises above a predetermined amount and to cause said means to actuate the shift mechanism to shift into low gear ratio when the vacuum in the manifold falls below a predetermined amount, said valve operating mechanism comprising the sole means for operating the valve, a manually operable switch in said solenoid circuit in series with said circuit controlling switch, and means for visually indicating when said circuit is closed or open.

4. A control system for use in a motor vehicle having an engine provided with an inlet manifold, a multi-speed transmission including high and low gear ratios and gear shift mechanism for said transmission, comprising mechanism for selectively shifting automatically said transmission into one or another of said gear ratios during the running of the engine including a power unit having a differential pressure operated means connected to said shift mechanism, a valve member connected to said manifold to control the application of pressure differential to said means, operating means for said valve consisting of a solenoid for operating said valve, a single solenoid circuit, a solenoid controlling switch in said circuit, a switch actuating member connected to said manifold and operable to open said solenoid circuit when the degree of vacuum in said manifold reaches a predetermined amount and to close said circuit when the degree of vacuum in the manifold reaches another predetermined amount, a switch in said solenoid circuit in series with said circuit controlling switch, and foot-actuated means for operating said latter switch.

5. A control system for use in a motor vehicle having an internal combustion engine provided with an inlet manifold, a two-speed axle transmission including high and low gear ratios, and shift mechanism for said transmission, of mechanism for selectively shifting said transmission into one or another of said gear ratios including a power unit having a vacuum controlled member connected to said shift mechanism for shifting said transmission into high gear ratio, spring means for causing said member to shift said transmission into low gear ratio when the vacuum on said member is rendered ineffective, means connecting said manifold with said member for applying vacuum to said member including a vented control valve, means for operating said valve to apply vacuum to said member to shift said transmission into high gear ratio, means for delaying the action of said operating means in effecting the latter shift, vacuum responsive means for rendering inoperative said valve operating means whereby to break the application of vacuum to said member and cause said spring to shift said transmission into low gear ratio, and manually operated means for rendering inoperative said valve operating means.

6. A control system for use in a motor vehicle having an internal combustion engine provided with an inlet manifold, a two-speed axle transmission including high and low gear ratios, and shift mechanism for said transmission, of mechanism for selectively shifting said transmission into one or another of said gear ratios including a power unit having a vacuum controlled member connected to said shift mechanism for shifting said transmission into high gear ratio, spring means for causing said member to shift said transmission into low gear ratio when the vacuum on said member is rendered ineffective, means connecting said manifold with said member for applying vacuum to said member including a vented control valve, means for operating said valve to apply vacuum to said member to shift said transmission into high gear ratio including a solenoid, said valve being operative to break the application of vacuum to said member when said solenoid is de-energized and to apply vacuum to said member when said solenoid is energized, a solenoid circuit controlling switch, and vacuum controlled means connected to said manifold for opening said switch when the vacuum in said manifold drops below a determinate amount, whereby to de-energize said solenoid and shift said transmission into low gear, and to close said switch to energize said solenoid and shift into high gear when the vacuum is above said determinate amount.

7. A control system for use in a motor vehicle having an internal combustion engine provided with an inlet manifold, a two-speed axle transmission including high and low gear ratios, and shift mechanism for said transmission, of mechanism for selectively shifting said transmission into one or another of said gear ratios including a power unit having a vacuum controlled member connected to said shift mechanism for shifting said transmission into high gear ratio, spring means for causing said member to shift said transmission into low gear ratio when the vacuum on said member is rendered ineffective, means connecting said manifold with said member for applying vacuum to said member including a vented control valve, means for operating said valve to apply vacuum to said member to shift said transmission into high gear ratio including a solenoid, said valve being operative to break the application of vacuum to said member when said solenoid is de-energized and to apply vacuum to said member when said solenoid is energized, a solenoid circuit controlling switch, and vacuum controlled means connected to said manifold for opening said switch when the vacuum in said manifold drops below a determinate amount, whereby to de-energize said solenoid and shift said transmission into low gear, and to close said switch to energize said solenoid and shift into high gear when the vacuum is above said determinate amount, and valve means delaying the restoration of vacuum on said switch-closing means to delay the re-energizing of said solenoid for a substantial period after de-energizing thereof.

8. A control system for use in a motor vehicle having an internal combustion engine provided with an inlet manifold, a two-speed axle transmission including high and low gear ratios, and shift mechanism for said transmission, of mechanism for selectively shifting said transmission into one or another of said gear ratios including a power unit having a vacuum controlled member connected to said shift mechanism for shifting said transmission into high gear ratio, spring means for causing said member to shift said transmission into low gear ratio when the vacuum on said member is rendered ineffective, means connecting said manifold with said member for applying vacuum to said member including a vented control valve, means for operating said valve to apply vacuum to said member to shift said transmission into high gear ratio including a solenoid, said valve being operative to break the application of vacuum to said member when said solenoid is de-energized and to apply vacuum to said member when said solenoid is energized, a solenoid circuit controlling switch, and vacuum controlled means connected to said manifold for opening said switch when the vacuum in said manifold drops below a determinate amount, whereby to de-energize said solenoid and shift said transmission into low gear, and to close said switch to energize said solenoid and shift into high gear when the vacuum is above said determinate amount, and means delaying the restoration of vacuum on said switch-closing means to delay the re-energizing of said solenoid for a substantial period after de-energizing thereof including a check valve connecting said manifold to said vacuum actuated switch means and having means for adjusting the valve opening for delaying the application of vacuum to said means from said manifold.

9. A control system for the shift mechanism of a multi-speed transmission, comprising a power unit including a vacuum operated member connected to said shift mechanism for shifting said transmission from one gear ratio to another, means connecting said member to a source of vacuum, a valve controlling the application of vacuum to said member, a solenoid for operating said valve whereby to cause said member to shift said transmission into one speed ratio when said solenoid is energized and into another speed ratio when said solenoid is de-energized, a solenoid circuit, a single circuit controlling switch vacuum responsive means connected to said source of vacuum for opening and closing said switch and operating said solenoid in accordance with the application of vacuum thereto, and means for delaying the operation of said valve operating mechanism when vacuum is re-established in the manifold after a break in vacuum.

10. A control system for the shift mechanism of a multi-speed transmission, comprising a power unit including a vacuum operated member connected to said shift mechanism for shifting said transmission from one gear ratio to another, means connecting said member to a source of vacuum, including a check valve adapted to close on loss of vacuum, a valve controlling the application of vacuum to said member, a solenoid for operating said valve whereby to cause said member to shift said transmission into one speed ratio when said solenoid is energized and into another speed ratio when said solenoid is de-energized, a solenoid circuit, a single circuit controlling switch including vacuum responsive means connected to said source of vacuum for opening and closing said switch and operating said solenoid in accordance with the application of vacuum thereto and means for delaying the action of said vacuum responsive means to delay the shift into one of said speed ratios.

11. The combination in a control system for a transmission shift mechanism having a vacuum operated power unit and a solenoid controled valve for controlling the applicaiton of vacuum to said unit, of a solenoid circuit, a circuit controlling switch, a vacuum responsive switch-operating member adapted to close said circuit to energize said solenoid when said vacuum exceeds a determinate amount and to open said circuit and de-energize said solenoid when said vacuum is less than said determinate amount, and means for delaying the action of said vacuum responsive member in closing said circuit.

12. The combination on in a control system for a transmission shift mechanism having a vacuum operated power unit and a solenoid controlled valve for controlling the application of vacuum to said unit, arranged to shift said transmission into high gear ratio when vacuum is applied to said unit and having means for shifting said transmission into low gear ratio when said operating vacuum is dumped, of a solenoid circuit, a circuit controlling switch, a vacuum responsive switch-operating member adapted to close said circuit to energize said solenoid when said vacuum exceeds a determinate amount to thereby shift said transmission into high gear, and to open said circuit and de-energize said solenoid to shift said transmission into low gear when said vacuum is less than said determinate amount, and means for delaying the action of said vacuum responsive member in closing said circuit.

13. A control system for use in a motor vehicle having an internal combustion engine provided with an inlet manifold, a multi-speed transmission having high and low gear ratios, and shift mechanism for shifting said transmission, comprising a differential pressure operated power unit connected to said shift mechanism, a valve controlling the application of differential pressure to said unit, mechanism responsive to manifold vacuum for operating said valve, and means delaying the rate of build-up of sufficient pressure differential on said valve operating mechanism to cause a shift of said transmission into high gear.

14. A control system for use in a motor vehicle having an internal combustion engine provided with an inlet manifold, a multi-speed transmission having high and low gear ratios, and shift mechanism for shifting said transmission, comprising a differential pressure operated power unit connected to said shift mechanism, a valve controlling the application of differential pressure to said unit, mechanism responsive to manifold vacuum for operating said valve, and means delaying the rate of build-up of sufficient pressure differential on said valve operating mechanism to cause a shift of said transmission into high gear while permitting undelayed operation of said valve operating mechanism to cause a shift into low gear.

15. A control system for use in a motor vehicle having an internal combustion engine provided with an inlet manifold, a multi-speed axle transmission including high and low gear ratios, and shift mechanism for said transmission, comprising a differential pressure operated power unit connected to said shift mechanism for shifting said transmission from one gear ratio to another, a valve controlling the application of pressure differential to said unit, mechanism responsive to manifold vacuum for operating said valve to cause said power unit to shift said transmission into one of said gear ratios and responsive to a break in manifold vacuum to operate said valve to cause said power unit to shift said transmission into another of said gear ratios, and means for delaying the operation of said valve operating mechanism when vacuum is re-established in said manifold after a break in vacuum.

16. A control system for a motor vehicle having an internal combustion engine provided with an inlet manifold, a multi-speed axle transmission including high and low gear ratios, and shift mechanism for said transmission, comprising a differential pressure operated power unit connected to said shift mechanism for shifting said transmission from one gear ratio to another, a valve controlling the application of said differential pressure to said unit, mechanism including a diaphragm responsive to manifold vacuum for operating said valve to cause said power unit to shift said transmission into one of said gear ratios and yieldable means operative on a break in manifold vacuum to operate said valve to cause said power unit to shift said transmission into another of said gear ratios, and means delaying the operation of said valve operating mechanism when vacuum is re-established in said manifold after a break in vacuum.

References Cited in the file of this patent

UNITED STATES PATENTS

| | | |
|---|---|---|
| 2,330,407 | Claytor | Sept. 28, 1943 |
| 2,349,147 | Dunn | May 16, 1944 |
| 2,366,253 | Griswold | Jan. 2, 1945 |
| 2,373,259 | Price | Apr. 10, 1945 |
| 2,506,105 | Price | May 2, 1950 |
| 2,523,726 | Seeger | Sept. 26, 1950 |
| 2,526,375 | Leibing | Oct. 17, 1950 |
| 2,548,138 | Ball | Apr. 10, 1951 |
| 2,568,958 | Hey et al. | Sept. 25, 1951 |